United States Patent
Akahira et al.

(10) Patent No.: US 6,604,821 B1
(45) Date of Patent: *Aug. 12, 2003

(54) METHOD AND APPARATUS FOR MANUFACTURING COLOR FILTER, DISPLAY DEVICE USING THE COLOR FILTER, AND ELECTRONIC EQUIPMENT COMPRISING THE DISPLAY DEVICE

(75) Inventors: Makoto Akahira, Kawasaki (JP); Keiichi Murai, Yokohama (JP); Hiroshi Sato, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/689,113

(22) Filed: Jul. 30, 1996

(30) Foreign Application Priority Data

Aug. 1, 1995 (JP) .............................................. 7-196391
Jul. 19, 1996 (JP) .............................................. 8-190526

(51) Int. Cl.[7] .................................................. B41J 3/407
(52) U.S. Cl. ......................................................... 347/106
(58) Field of Search ............................... 347/106, 8, 37, 347/107, 1, 20, 40, 42, 41, 12; 427/510–512, 514, 521

(56) References Cited

U.S. PATENT DOCUMENTS

| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,608,577 A | 8/1986 | Hori |
| 4,631,548 A * | 12/1986 | Milbrandt .................... 347/15 |
| 4,723,129 A | 2/1988 | Endo et al. |
| 4,740,796 A | 4/1988 | Endo et al. |
| 4,752,771 A | 6/1988 | Katogi et al. |
| 4,965,593 A * | 10/1990 | Hickman .................... 347/12 |
| 5,285,298 A | 2/1994 | Kaneko et al. |
| 5,384,587 A * | 1/1995 | Takagi et al. .................. 347/41 |
| 5,388,919 A * | 2/1995 | Kimura et al. ................ 347/40 |
| 5,485,183 A * | 1/1996 | Zandian et al. ............... 347/41 |
| 5,576,070 A * | 11/1996 | Yaniv .......................... 427/510 |
| 5,670,205 A | 9/1997 | Miyazaki et al. |
| 5,726,724 A | 3/1998 | Shirota et al. |
| 5,777,640 A * | 7/1998 | Shioya et al. ................ 347/15 |

FOREIGN PATENT DOCUMENTS

| EP | 0 471 488 | 2/1992 |
| EP | 0 526 233 | 2/1993 |
| EP | 675 385 | * 3/1995 |
| EP | 0 655 631 | 5/1995 |
| JP | 54-056847 | 5/1979 |
| JP | 54-158232 | 12/1979 |
| JP | 59-123670 | 7/1984 |
| JP | 59-138461 | 8/1984 |
| JP | 60-071260 | 4/1985 |
| JP | 63-235901 | 9/1988 |
| JP | 2-173704 | 7/1990 |
| JP | 4-261503 | 9/1992 |

(List continued on next page.)

*Primary Examiner*—John Barlow
*Assistant Examiner*—Michael S. Brooke
(74) *Attorney, Agent, or Firm*—Fitzpatrick, Cella, Harper & Scinto

(57) ABSTRACT

There are disclosed an apparatus and method for manufacturing a color filter for a liquid crystal display by forming a plurality of color elements on a glass substrate. Three ink-jet heads respectively having R, G, and B color ink are moved relative to the glass substrate, and form color elements by ejecting corresponding color ink onto positions, corresponding to the color elements, on the substrate. Each color element has a shape elongated in the arrangement direction of nozzles of the ink-jet heads, and is made up of a plurality of ink ejections from different nozzles of the ink-jet head.

30 Claims, 11 Drawing Sheets

FOREIGN PATENT DOCUMENTS

| | | |
|---|---|---|
| JP | 4-358859 | 12/1992 |
| JP | 5-301379 | 11/1993 |
| JP | 6-71879 | 3/1994 |
| JP | 7-9722 | 1/1995 |
| JP | 7-146406 | 6/1995 |
| JP | 9-511585 | 11/1997 |
| WO | WO 95/21400 | 8/1995 |

* cited by examiner

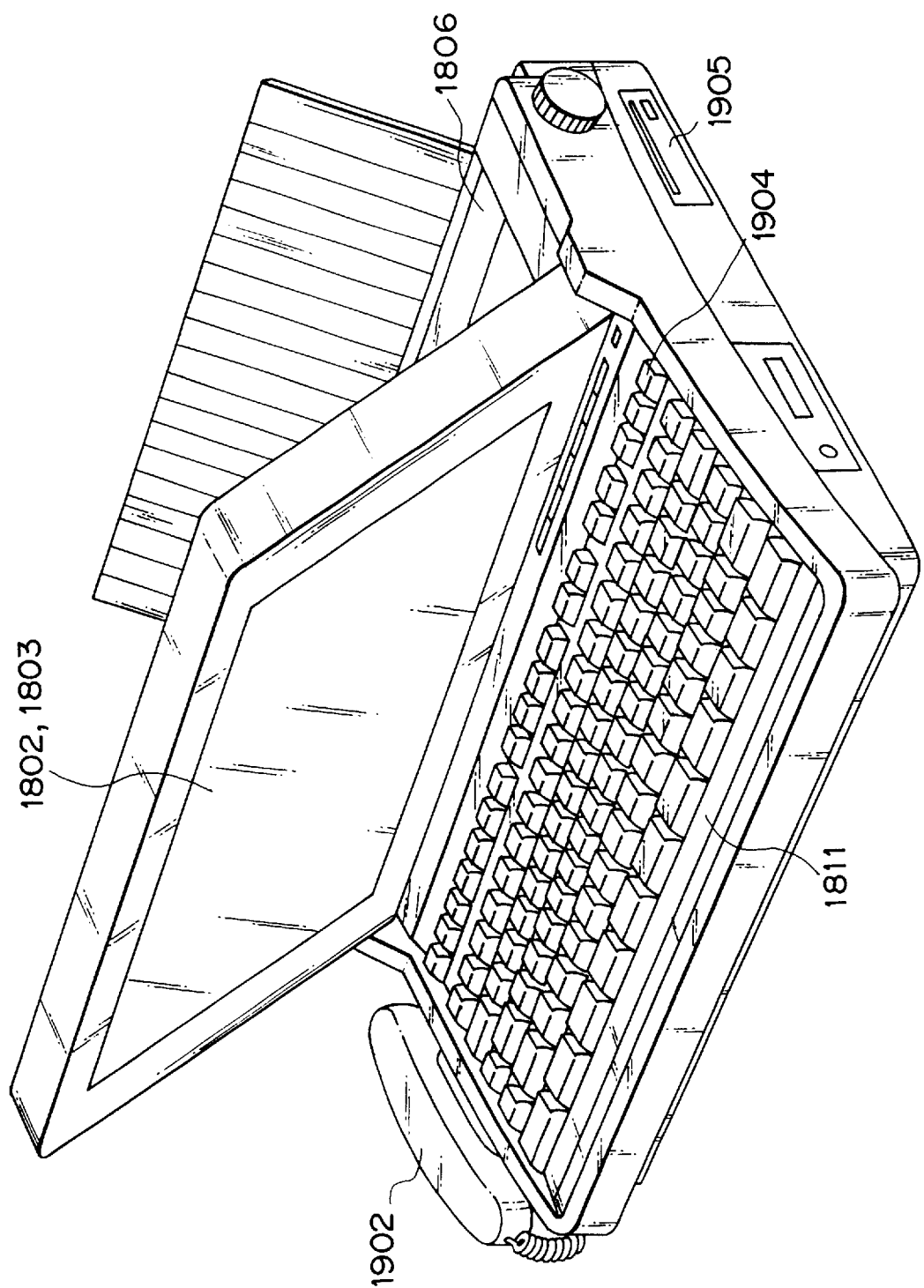

METHOD AND APPARATUS FOR MANUFACTURING COLOR FILTER, DISPLAY DEVICE USING THE COLOR FILTER, AND ELECTRONIC EQUIPMENT COMPRISING THE DISPLAY DEVICE

BACKGROUND OF THE INVENTION

The present invention relates to a method and apparatus for manufacturing a color filter for a color liquid crystal display used in, e.g., a color television, a personal computer, or the like, a display device using the color filter, and an electronic equipment comprising the color display device.

It has been proposed to manufacture, using an ink-jet method, a color filter used in a display device using a color liquid crystal. Each color element (pixel) of such color filter manufactured by using the ink-jet method has a width of one dot ejected from one nozzle of an ink-jet head, and a length of a plurality of dots in its longitudinal direction. The color filter is constituted by arranging a plurality of color elements on a glass substrate.

Conventionally, the ink-jet head is scanned along the widthwise direction of the color filter, and each color element is formed by ink ejected from one nozzle. For this reason, if the amounts of ink ejected from nozzles vary, the variations of the amount of ink appear as variations in densities of the color elements.

SUMMARY OF THE INVENTION

The present invention has been made in consideration of the prior art, and has as its object to provide a method and apparatus for manufacturing a color filter, which can suppress variations in colors and densities of color elements by forming one color element by ink ejected from different nozzles.

It is another object of the present invention to provide a method and apparatus for manufacturing a color filter, which can display a high-quality color image, by supplying a color ink of a predetermined amount accurately to a predetermined position on a substrate, while eliminating the influence of a difference in ink ejection amount among nozzles of an ink-jet head.

It is still another object of the present invention to provide a method and apparatus for manufacturing a color filter, which can suppress variations in colors and densities of color elements.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 11 is a schematic perspective view showing the information processing apparatus in which the liquid crystal display device of the embodiment is incorporated.

DESCRIPTION OF THE PREFERRED EMBODIMENTS

The preferred embodiment of the present invention will be described in detail hereinafter with reference to the accompanying drawings.

Figure 1:
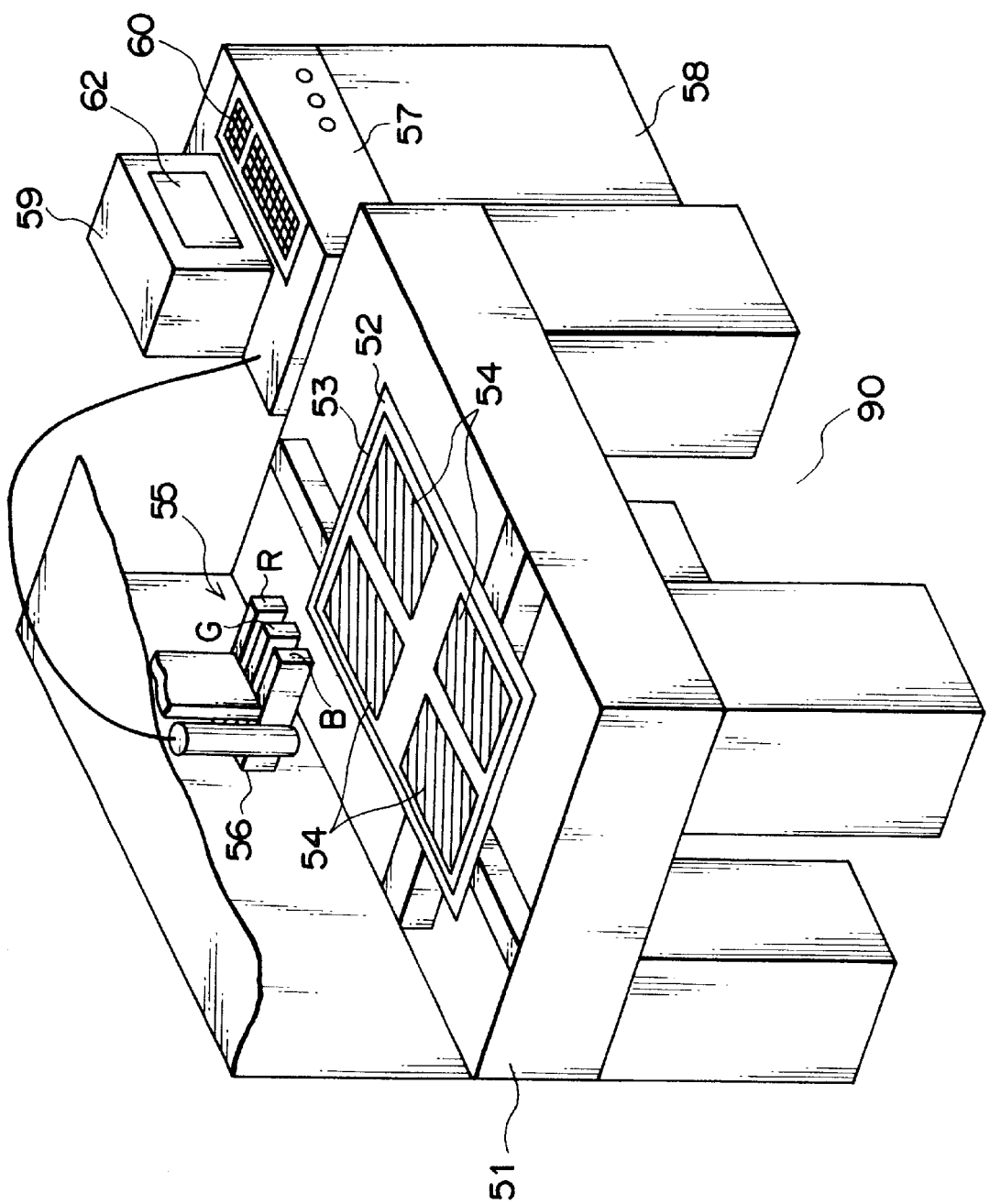
FIG. 1 is a perspective view showing the arrangement of principal part of a color filter manufacturing apparatus according to an embodiment of the present invention.

FIG. 1 is a perspective view showing the outer appearance of a color filter manufacturing apparatus 90 according to an embodiment of the present invention.

Referring to FIG. 1, reference numeral 51 denotes a base of the apparatus; 52, an XYθ stage arranged on the base 51; 53, a glass substrate for a color filter, which is set on the XYθ stage 52; and 54, color filter portions formed on the color filter substrate 53. Reference numeral 55 denotes R (red), G (green), and B (blue) ink-jet heads for performing coloring on the color filter portions 54. Reference numeral 56 denotes a television camera having a built-in line sensor for reading a portion where color elements are formed by the ink-jet heads 55, and detecting non-ejection nozzles of the heads 55. Reference numeral 57 denotes an image processing device for processing image data picked up by the television camera 56, and inspecting the presence/absence of non-ejection nozzles of the ink-jet heads 55; 58, a controller for controlling the operation of the overall color filter manufacturing apparatus 90; 59, a teaching pendant (personal computer) having a display 62 and input units (keyboard) 60 of the controller 58; and the keyboard 60 serves as an operation unit of the personal computer 59.

Figure 2:
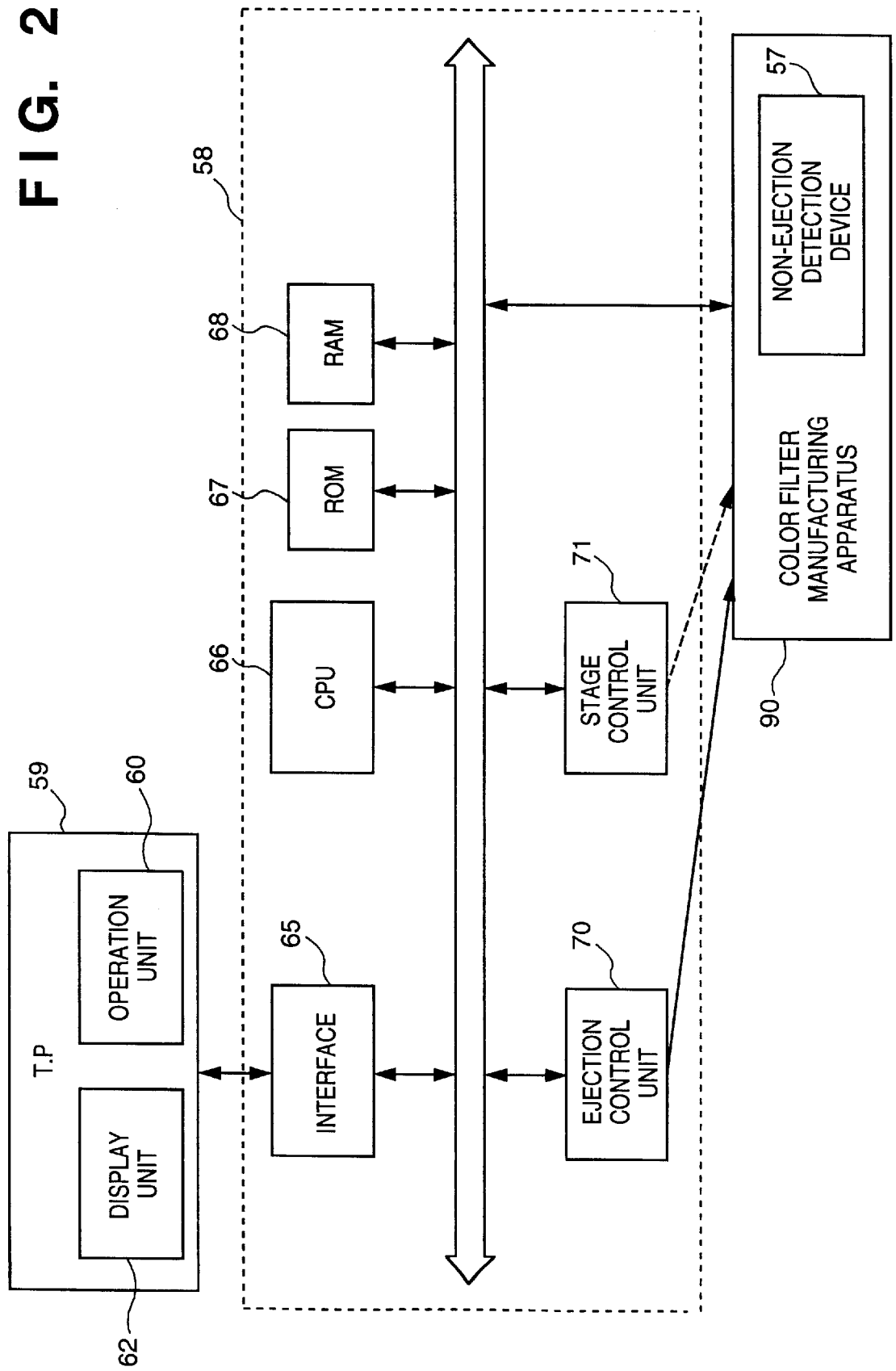
FIG. 2 is a block diagram showing the arrangement of the color filter manufacturing apparatus of the embodiment shown in FIG. 1.

FIG. 2 is a block diagram showing the arrangement of the controller 58 for controlling the color filter manufacturing apparatus 90 of this embodiment.

The personal computer 59 serves as input/output means of the controller 58, and a display unit 62 displays information such as the progress of the manufacture of the color filter, the presence/absence of abnormalities of the heads 55, and the like. Reference numeral 60 denotes an operation unit (keyboard) for instructing the operations and the like of the color filter manufacturing apparatus 90.

The controller 58 controls the operation of the overall color filter manufacturing apparatus 90. An interface 65 controls data exchange between the personal computer 59 and the controller 58. Reference numeral 66 denotes a CPU for controlling the color filter manufacturing apparatus 90 of this embodiment; 67, a ROM for storing a control program for controlling the operation of the CPU 66; 68, a RAM which is used as a work area under control of the CPU 66, and stores various data, abnormality information, and the like; 57, a non-ejection detection device (e.g., an image processing device) which is connected to the television camera 56, and detects non-ejection nozzles of the ink-jet heads 55. Reference numeral 70 denotes an ejection control unit for controlling ejection of ink into each pixel of the color filter. A stage control unit 71 controls the movement of the XYθ stage 52 of the color filter manufacturing apparatus 90. The color filter manufacturing apparatus 90 is connected to the controller 58 and operates in accordance with an instruction from the controller 58.

Figure 3:
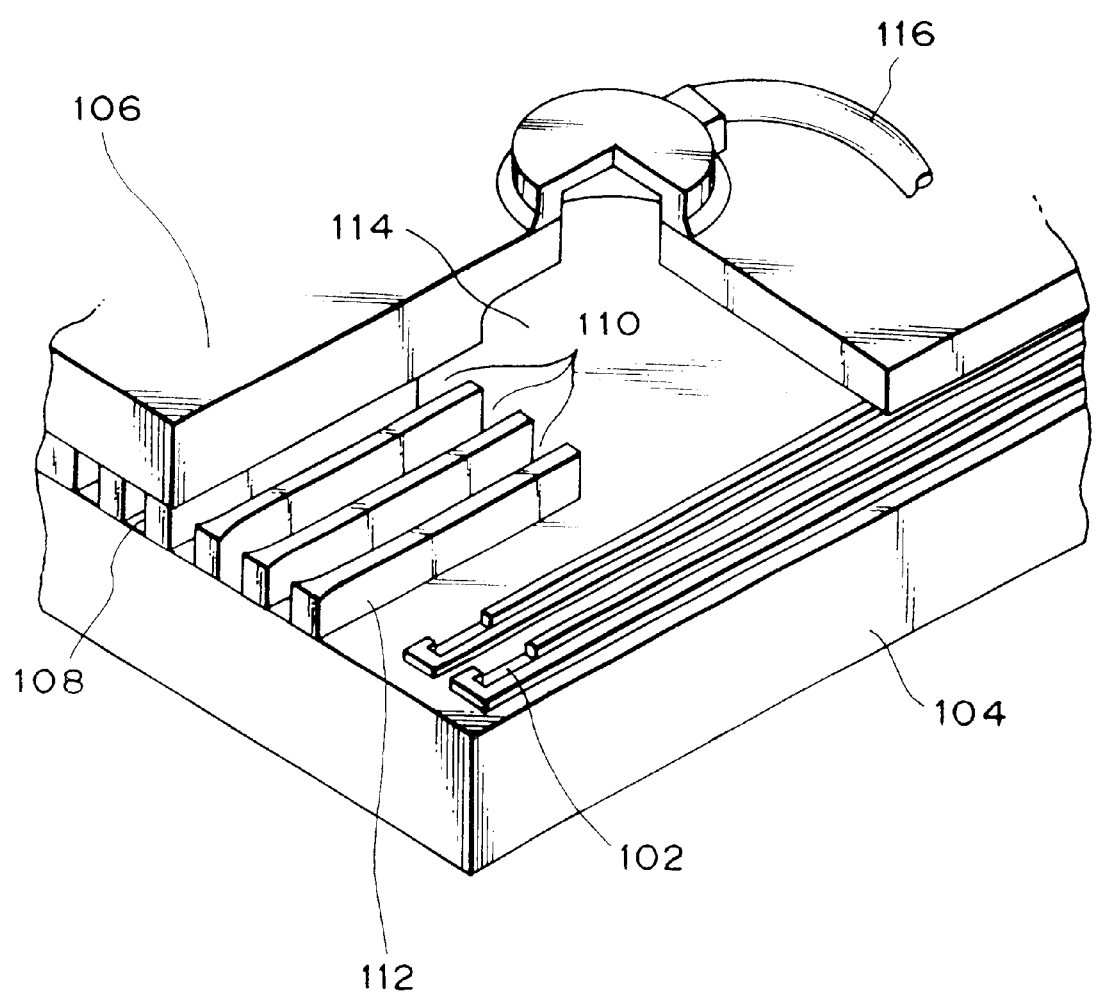
FIG. 3 is a partially cutaway perspective view showing the arrangement of an ink-jet head of the embodiment.

FIG. 3 is a perspective view showing the structure of each ink-jet head 55 used in the color filter manufacturing apparatus 90 of this embodiment. In FIG. 1, three ink-jet heads 55 are arranged in correspondence with three colors, i.e., R, G, and B. However, since these three heads have the same structure, FIG. 3 shows the structure of one of these three heads.

Referring to FIG. 3, the ink-jet head 55 is mainly constituted by a heater board 104 as a board formed with a plurality of heaters 102 for heating ink, and a top plate 106 that covers the top of the heater board 104. The top plate 106 is formed with a plurality of ejection ports 108, and tunnel-shaped ink channels 110 that communicate with the ejection ports 108 are formed on inner side of the ejection ports 108. Each ink channel 110 is partitioned from neighboring ink channels via partition walls 112. The rear ends of the ink channels 110 are commonly connected to a single ink reservoir 114. The ink reservoir 114 receives ink from an ink tank (not shown) via an ink supply port 116, and supplies the ink to the respective ink channels 110.

The heater board 104 and the top plate 106 are aligned and assembled in a state shown in FIG. 3, so that the heaters 102 are located at positions corresponding to the ink channels 110. Although FIG. 3 illustrates only two heaters 102, the heaters 102 are arranged in correspondence with the ink channels 110. In the assembled state shown in FIG. 3, when a predetermined driving pulse is supplied to each heater 102, the ink on the heater 102 is boiled and forms a bubble, and the ink is pushed out and ejected from the corresponding ejection port 108 due to the volume expansion of the bubble. Therefore, by controlling the driving pulse to be applied to the heater 102, i.e., by controlling the magnitude of electric power, the size of the bubble can be adjusted, and hence, the volume (amount) of ink ejected from the ejection port 108 can be easily controlled.

Figure 4A:
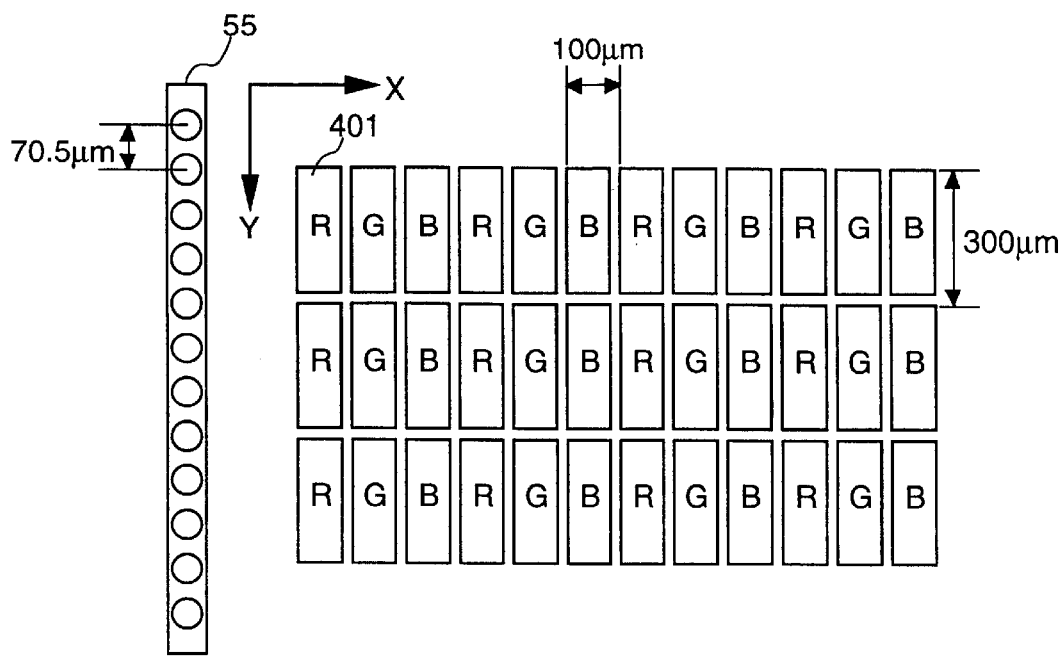
FIGS. 4A and 4B are views showing the positional relationship between the ink-jet head and color elements on a color filter substrate in the embodiment.
Figure 4B:
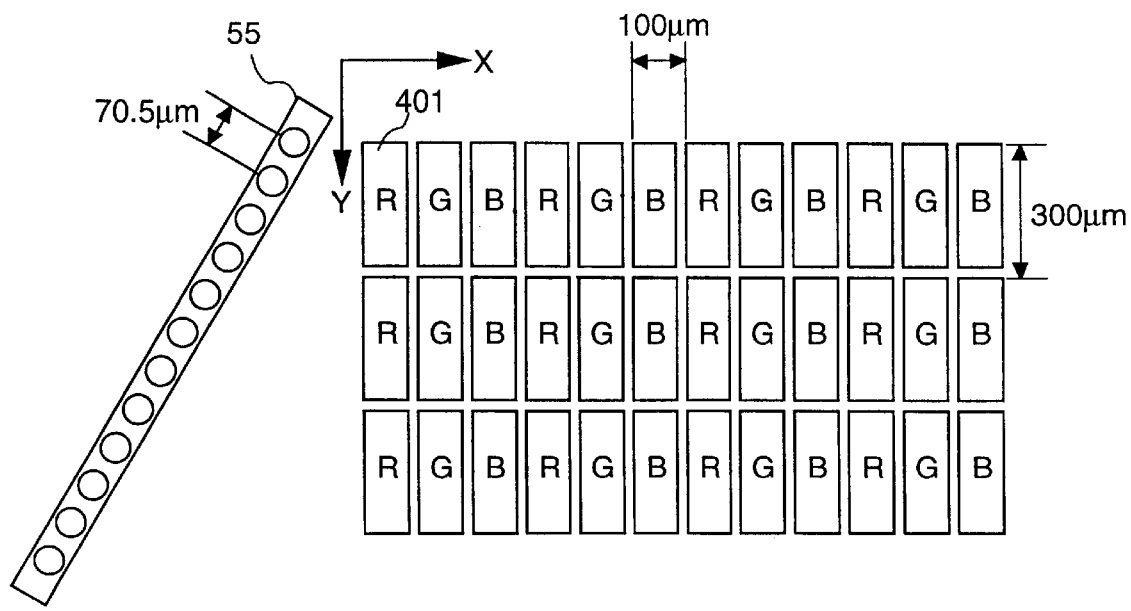

FIGS. 4A and 4B show the relationship between the ink-jet head 55 and color elements 401 of the color filter portion 54 formed on the substrate (glass plate) 53. FIG. 4A illustrates a case wherein the ink-jet head 55 is located to be substantially parallel to the longitudinal (Y) direction of the color elements 401, and FIG. 4B illustrates a case wherein the ink-jet head 55 is inclined with respect to the longitudinal (Y) direction of the color elements 401. Note that FIGS. 4A and 4B illustrate only the ink-jet head for one color, and do not illustrate other color heads. The inclination of the ink-jet head 55 relative to the Y direction of the color elements by a predetermined amount, as shown in FIG. 4B, is attained by rotating the XYθ stage 52 by the stage control unit 71 in this embodiment. However, the ink-jet head 55 itself may be inclined.

As can be seen from FIGS. 4A and 4B, the color elements 401 of the color filter are arranged at pitches of about 100 μm in the X direction and about 300 μm in the Y direction, and arrays of color elements are formed in the order of R, G, and B from the left end (FIGS. 4A and 4B) of the color filter. The nozzle pitch of the ink-jet head 55 is about 70.5 μm. Therefore, in the case of FIG. 4A, each color element 401 is formed by about three to four dots (ink), and in the case of FIG. 4B, one color element 401 is formed by dots (ink) more than those in FIG. 4A. Upon such ink supply, a so-called multi-path method for scanning the ink-jet head 55 or the glass substrate 53 a plurality of number of times may be adopted. In this case, ink may be ejected from odd-numbered nozzles in the first pass, and may be ejected from even-numbered nozzles in the second pass (2 path method).

FIGS. 5A to 5F are views for explaining the manufacturing process of the color filter in this embodiment. Note that FIGS. 5A to 5F exemplify a case wherein a resin composition layer 3 for receiving ink is formed on a glass substrate 1. However, the present invention is not limited to this specific structure. For example, color elements may be formed by directly supplying ink onto the glass substrate 1 (53).

Figure 5A:
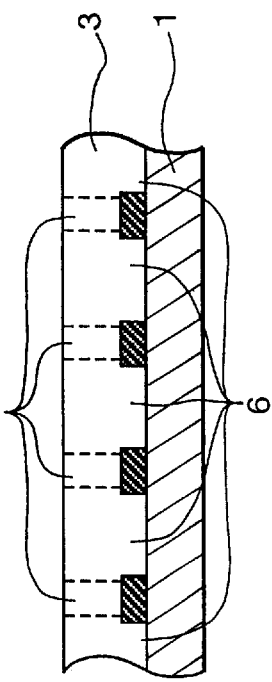
FIGS. 5A to 5F are views showing the manufacturing process of the color filter in the embodiment.
Figure 5B:
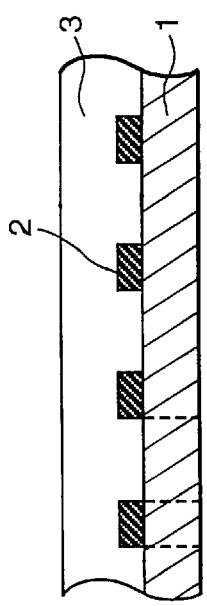
Figure 5C:
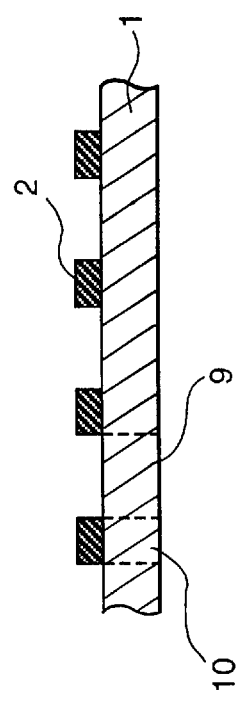

FIG. 5A shows the glass substrate 1 comprising light-transmitting portions 9 (portions to be colored) and a black matrix 2 that constitutes light-shielding portions 10. Note that the black matrix 2 is not always required. The substrate 1 formed with the black matrix 2 is coated with a resin composition, which is pre-baked as needed to form the resin composition layer 3 (FIG. 5B). This resin composition itself has poor ink receptivity, but is imparted with ink affinity under a given condition (e.g., light irradiation or light irradiation and heating) and is set under another condition. Note that the resin composition layer 3 may be formed by various coating methods such as a spin coating method, a roll coating method, a bar coating method, a spray coating method, a dip coating method, and the like, and the method to be used is not particularly limited.

Figure 5D:
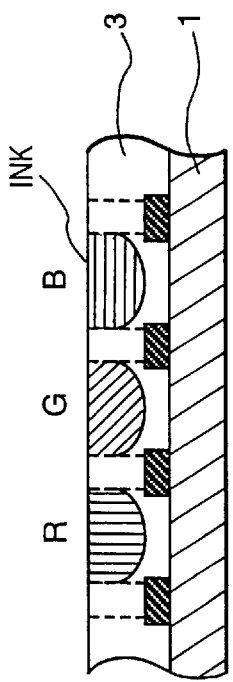
Figure 5E:
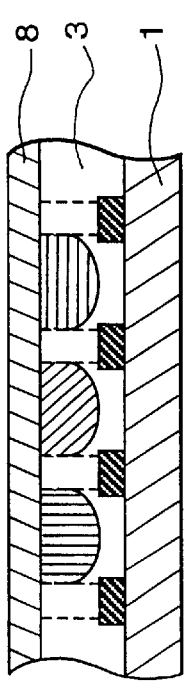

Using a photomask 4, resin layer portions on the light-transmitting portions 9 are subjected to pattern exposure, so that non-masked resin layer portions are imparted with ink affinity (FIG. 5C), thereby forming portions 6 with ink affinity (exposed portions) and portions 5 without ink affinity (masked portions) on the resin composition layer 3 (FIG. 5D).

Thereafter, R (red), G (green), and B (blue) color ink are ejected from the ink-jet head 55 onto the resin composition layer 3 to color the portions 6 (FIG. 5E), and the ink is dried as needed. As the ink-jet method in this case, a thermal energy method and a mechanical energy method are known, and either of these methods can be suitably used. The type of the ink to be used is not particularly limited as long as it is able to be used as one for the ink-jet method. As the ink coloring agents, coloring agents that match transmission spectra required for the individual R, G, and B pixels are appropriately selected from various kinds of pigments or dyes.

Figure 5F:
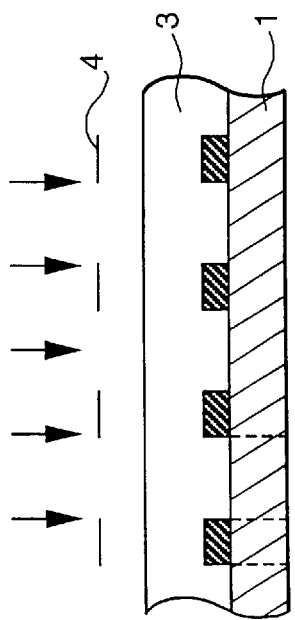

Subsequently, a light irradiation or light irradiation & heat treatment is performed to set the colored resin composition layer 3, and a protection layer 8 is coated on the surface of the layer 3 as needed (FIG. 5F). In order to set the resin composition layer 3, a condition different from that for the above-mentioned ink affinity treatment (FIG. 5C), e.g., a method of increasing the exposure amount upon light irradiation, a method of changing the heating condition, a method of using both light irradiation and heat treatments, or the like may be adopted.

FIGS. 6A to 6F show another manufacturing process of the color filter.

Figure 6A:
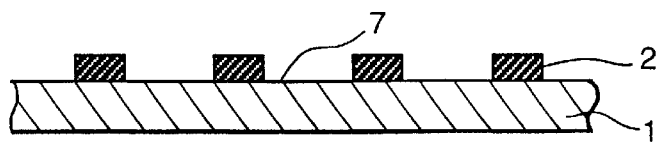
FIGS. 6A to 6F are views showing another manufacturing process of the color filter in the embodiment.
Figure 6B:
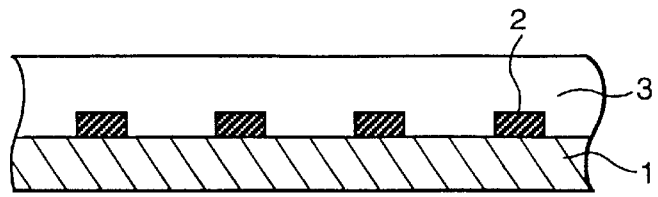

FIG. 6A shows a glass substrate 1 comprising light-transmitting portions 7 and a black matrix 2 serving as light-shielding portions. The substrate 1 formed with the black matrix 2 is coated with a resin composition, which is pre-baked as needed to form a resin layer 3 (FIG. 6B). In this case, the resin composition can be set by light irradiation or light irradiation and heating, and has ink receptivity. The resin composition layer 3 may be formed by various coating methods such as spin coating method, roll coating method, bar coating method, spray coating method, dip coating method, and the like, and the method to be used is not particularly limited.

Figure 6C:
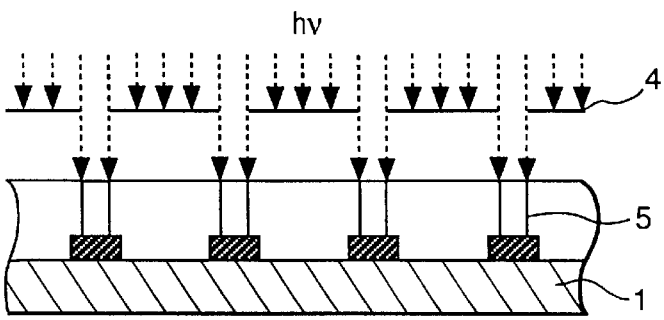
Figure 6D:
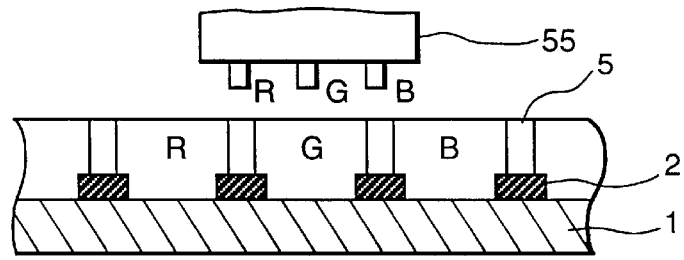

Subsequently, portions, corresponding to the light-shielding portions of the black matrix 2, of the resin layer 3 are subjected to pattern exposure in advance using a photomask 4, and are set to form portions 5 (non-colored portions) which do not absorb any ink (FIG. 6C). Thereafter, using the ink-jet heads 55, R, G, and B ink are ejected onto other portions (FIG. 6D), and are dried as needed.

As the photomask 4 used upon pattern exposure, a mask having aperture portions for setting the light-shielding portions of the black matrix 2 is used. In this case, in order to prevent color omission on portions contacting the black matrix 2, a relatively large amount of ink must be supplied. For this purpose, mask 4 having aperture portions narrower than the light-shielding) widths of the black matrix 2 is preferably used.

As for ink used for coloring, both dye- and pigment-based ink may be used, and both liquid and solid ink may be used.

As the set-able resin composition used in this embodiment, the present invention is not particularly limited to a specific one as long as the resin has ink receptivity, and can be set by light irradiation or at least one treatment of light irradiation and heating. As the resin, for example, an acrylic resin, epoxy resin, silicone resin, cellulosics such as hydroxypropyl cellulose, hydroxyethyl cellulose, methyl cellulose, carboxymethylcellulose, and the like or their modified substances, and the like may be used.

In order to promote the crosslinking reaction of such resins by means of light or light and heat, a light initiator (crosslinking agent) may be used. As the light initiator, a dichromate, a bisazide, a radical-based initiator, a cation-based initiator, an anion-based initiator, and the like may be used. Alternatively, these light initiators may be mixed or may be used in combination with other sensitizing agents. Furthermore, a photo-acid generation agent such as an onium salt may be used as a crosslinking agent together. In order to further promote the crosslinking reaction, a heat treatment may be performed after light irradiation.

Since the resin layer containing such compositions has very high heat and water resistances, it can sufficiently withstand a high-temperature or washing process to be performed later.

As the ink-jet method used in this embodiment, a bubble-jet type using electro-thermal energy converting elements as energy generation elements, a piezo-jet type using piezo-electric elements, or the like may be used, and the coloring area and coloring pattern may be arbitrarily set.

In this example, the black matrix 2 is formed. This black matrix may be formed on the resin layer after a settable resin composition layer is formed or after coloring, and its pattern is not limited to that of this example. As the formation method of the black matrix, it is preferable that a metal thin film be formed on the substrate 1 by sputtering or deposition, and be patterned by a photolithography process. However, the present invention is not limited to this particular method.

Figure 6E:
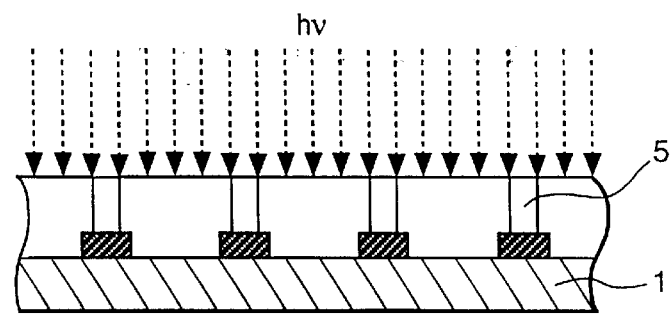
Figure 6F:
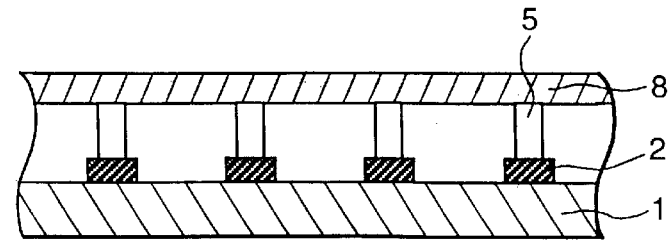

Subsequently, only a heat treatment or a light irradiation and heat treatment is performed to set the settable resin composition (FIG. 6E), and a protection layer 8 is formed (FIG. 6F) as needed. Note that hv in FIGS. 6C and 6E represents the light intensity, and in the case of the heat treatment, heat is applied in place of light. As the protection layer 8, arbitrary layers may be used as long as they can be formed using a photo-setting type, a thermo-setting type, or photo-/thermo-setting type second resin composition, or can be formed using an inorganic material by deposition or sputtering, have transparency as a constituting element of the color filter, and can sufficiently withstand an ITO formation process, an orientation film formation process, or the like to be performed later.

Figure 7:
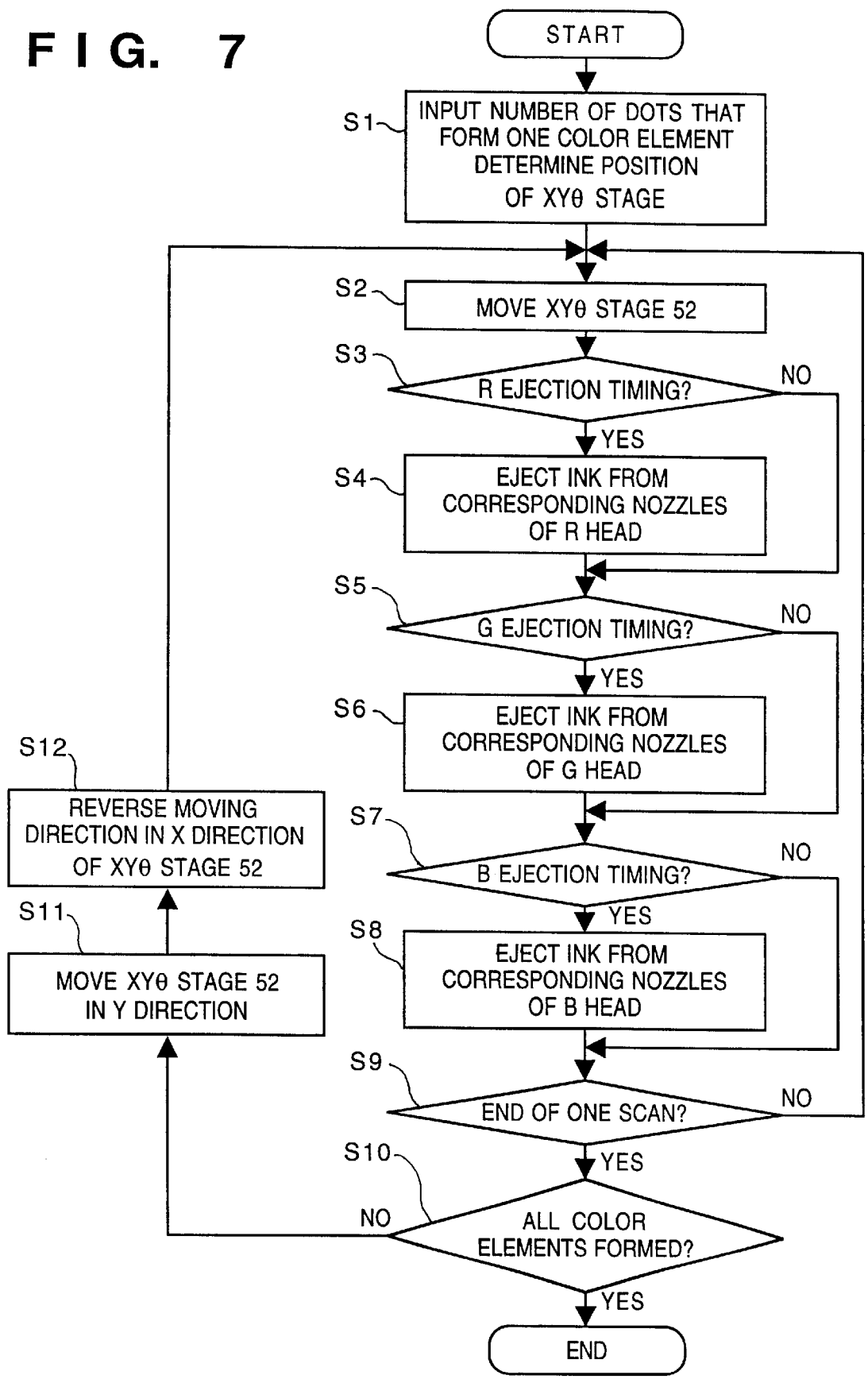
FIG. 7 is a flow chart showing the color element forming processing in the color filter manufacturing apparatus in the embodiment shown in FIG. 1.

FIG. 7 is a flow chart showing the color filter manufacturing processing in the color filter manufacturing apparatus 90 of this embodiment. The control program which executes this processing is stored in the ROM 67 shown in FIG. 2, and is executed under the control of the CPU 66.

When a color filter manufacturing instruction is input, the number of dots that form one color element 401 on the color filter is input from the operation unit 60 in step S1. Depending on this value, the longitudinal direction of the heads 55 is set to be parallel to the Y direction, as shown in, e.g., FIG. 4A, or the heads 55 are inclined by a predetermined amount with respect to the Y direction by setting the relative angle between the heads 55 and the XYθ table 52 as shown in FIG. 4B when a larger number of dots is designated (this state is attained by rotating the XYθ table 52 or the heads 55). In this manner, the initial position of the XYθ table 52 is determined.

The flow then advances to step S2, and the XYθ table 52 begins to move in the -X direction. It is then checked in step S3 if the ink ejection timing of the R head has reached, i.e., the corresponding nozzles of the R head have reached a position where R color elements are to be formed. This checking step is attained based on the initial position and moving amount of the XYθ table 52, the positions of the color ink-jet heads 55, and their nozzle positions. If it is determined in step S3 that the ink ejection timing of the R head has been reached, the flow advances to step S4, and ink is ejected from a plurality of corresponding nozzles of the R head to form R color elements. In this case, in the case of, e.g., FIG. 4B, ink may be ejected from only one nozzle of the R head instead of a plurality of nozzles upon an ink ejection. Also, even when ink is simultaneously ejected from a plurality of nozzles, one color element 401 may not be formed by a single ink ejection operation, but may be formed by a plurality of ink ejection operations. The same applies to the G and B colors to be described below.

It is checked in step S5, as in step S3 above, if the G head has reached the position of G color elements of the color filter portion 54. If YES in step S5, the flow advances to step S6, and ink is ejected using corresponding nozzles of the G head as in step S4 above. Furthermore, it is similarly determined in step S7 whether the ejection timing of ink from the B head has been reached. If YES in step S7, the flow advances to step S8, and ink is ejected from the corresponding nozzles of the B head as in step S4 or S6 above, thus forming B color elements. Thereafter, the flow advances to step S9 to check if a single scan operation in the X direction has been completed. If NO in step S9, the flow advances to step S2 to execute the above-mentioned processing.

On the other hand, if YES in step S9, the flow advances to step S10 to check if all the intended color elements are formed on the substrate 53 shown in FIG. 1. If YES in step S10, the processing ends; otherwise, the flow advances to step S11, and the XYθ stage 52 is moved in the -Y direction. In step S12, the relative moving direction between the heads 55 and the XYθ table 52 is set in a direction opposite to that in the above processing (i.e., a direction opposite to the X direction indicated by an arrow in FIG. 4A). Thereafter, the flow returns to step S2.

Note that the moving amount, in the Y direction, of the table 52 in step S11 varies depending on, e.g., the degree of overlapping of dots in the Y direction, the interval, in the Y direction, of the color elements 401, and the like. Also, when color elements are formed by relatively moving the heads and the table in a direction opposite to the X direction, the driving timings of the nozzles of the respective heads are adjusted in correspondence with the positions of the heads and their inclination, as a matter of course.

Figure 8:
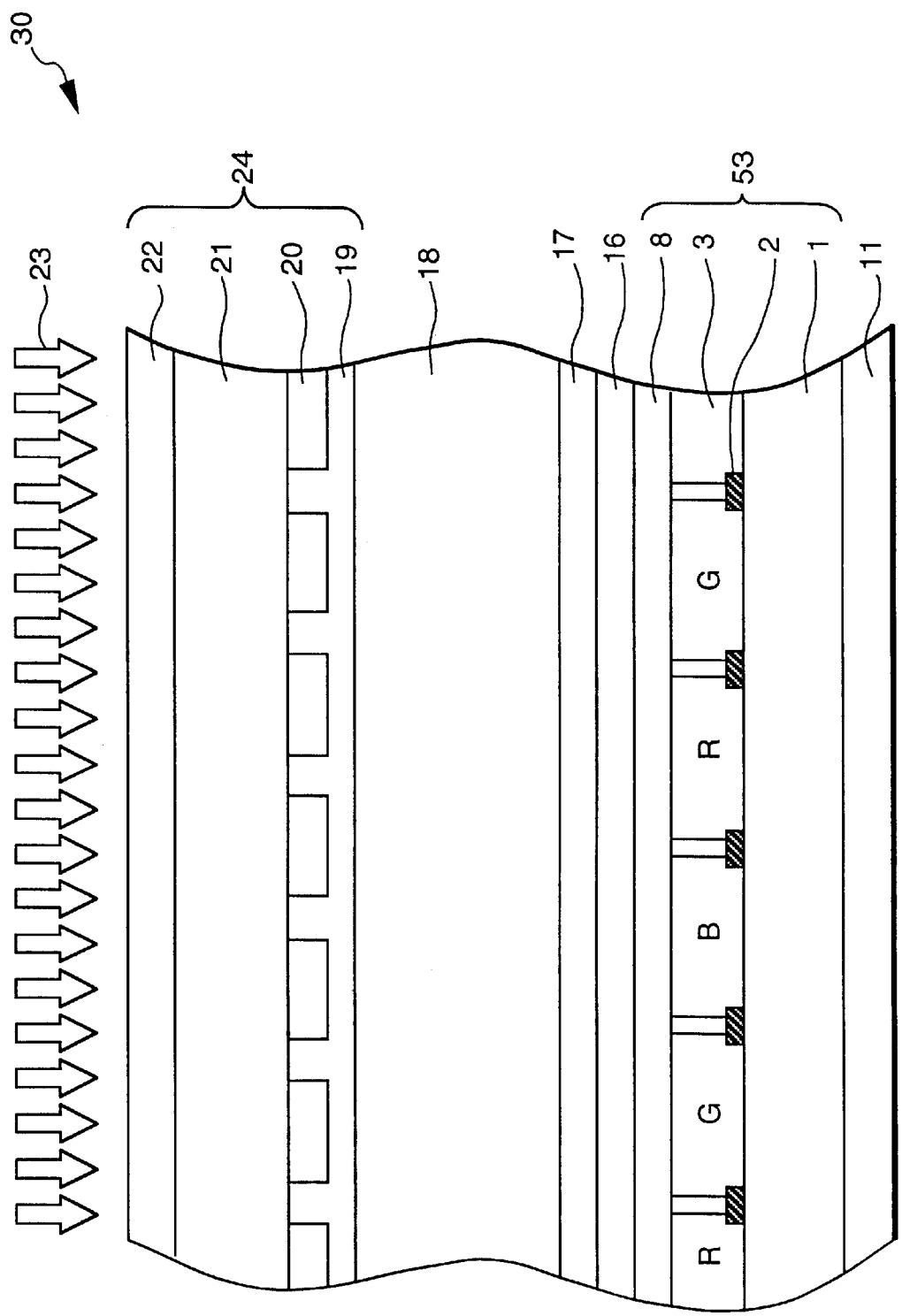
FIG. 8 is a sectional view showing the basic arrangement of a color liquid crystal display device which incorporates the color filter of the embodiment.

FIG. 8 is a sectional view showing the basic arrangement of a display screen of a color liquid crystal display 30 which incorporates the above-mentioned color filter.

Reference numeral 11 denotes a polarizing plate; 1, a transparent substrate such as glass; 2, a black matrix; 3, a resin composition layer; 8, a protection layer; 16, a common electrode; 17, an orientation film; 18, a liquid crystal compound; 19, an orientation film; 20, pixel electrodes; 21, a glass substrate; 22, a polarizing plate; and 23, backlight light. Reference numeral 53 denotes the color filter mentioned above; and 24, a counter substrate.

In the color liquid crystal display 30 of this embodiment, the color filter 53 and the counter substrate 24 are fitted with each other, the liquid crystal compound 18 is sealed therebetween, and transparent pixel electrodes 20 are formed in a matrix on the inner surface of the substrate 21 that opposes the color filter 53. The color filter 53 is arranged, so that R, G, and B pixels are aligned at the positions of the pixel electrodes 20.

Furthermore, the orientation films 17 and 19 are formed on the inner surfaces of the substrates 1 and 21, and by a rubbing treatment of these films, liquid crystal molecules align in a predetermined direction. The polarizing plates 11 and 22 are adhered on the outer surfaces of the substrates 1 and 21, and a combination of a fluorescent lamp and a scattering plate (neither are shown) is normally used as a backlight. A display operation is attained in such a manner that the liquid crystal compound 18 serves as an optical shutter for changing the transmittance of the backlight light 23.

In FIGS. 6A to 6F above and FIG. 8, the black matrix 2 is formed on the glass substrate 1 side. However, the present invention is not limited to this structure. For example, the black matrix 2 may be formed on the glass substrate 21 of the counter substrate 24.

An example in which such liquid crystal display is applied to an information processing apparatus will be described below with reference to FIGS. 9 to 11.

Figure 9:
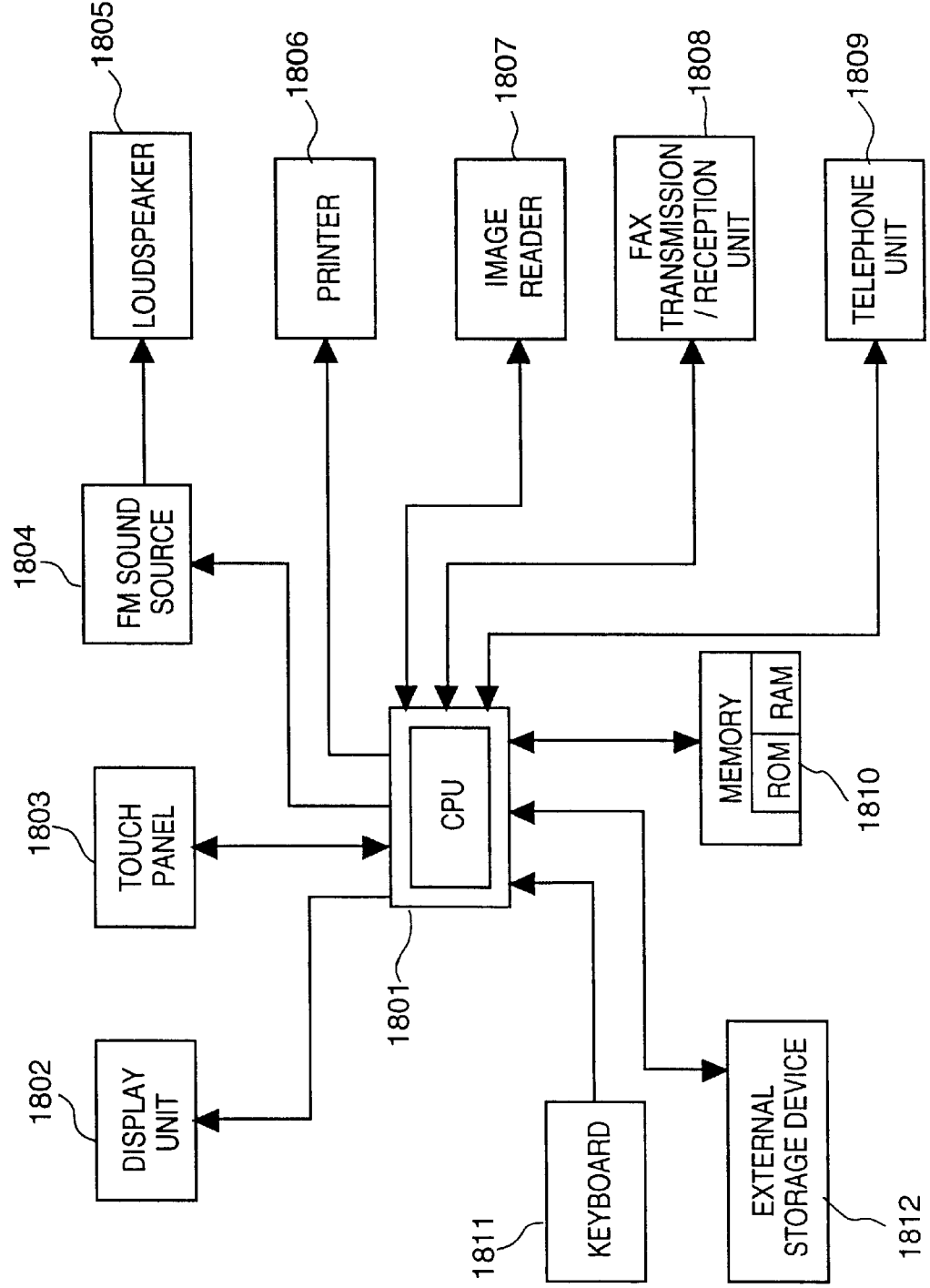
FIG. 9 is a block diagram showing the arrangement of an information processing apparatus in which the liquid crystal display device of the embodiment is incorporated.

FIG. 9 is a schematic block diagram showing the arrangement used when the above-mentioned liquid crystal display is applied to an information processing apparatus having functions of a wordsprocessor, a personal computer, a facsimile apparatus, and a copying machine.

Referring to FIG. 9, reference numeral 1801 denotes a control unit for controlling the entire apparatus. The control unit 1801 comprises a CPU such as a microprocessor or the like, and various I/O ports, and makes control by outputting control signals, data signals, and the like to the respective units, and receiving control signals and data signals from the respective units. Reference numeral 1802 denotes a display for displaying various menus, document information, image data read by an image reader 1807, and the like on its display screen. Reference numeral 1803 denotes a touch panel arranged on the display 1802. When a user presses the surface of the touch panel 1803 with, e.g., his or her finger, he or she can input an item, coordinate position, and the like on the display 1802.

Reference numeral 1804 denotes an FM (Frequency Modulation) sound source unit which stores music information created by, e.g., a music editor or the like in a memory 1810 or an external storage device 1812 as digital data, and FM-modulates the digital data read out from the memory or the like. An electrical signal from the FM sound source unit 1804 is converted into audible tones via a loudspeaker 1805. A printer 1806 is used as an output terminal for the wordprocessor, personal computer, facsimile apparatus, and copying machine.

Reference numeral 1807 denotes an image reader for photoelectrically reading original data and inputting read original data. The image reader 1807 is arranged in the middle of an original convey path, and reads various kinds of originals such as facsimile originals, copy originals, and the like.

Reference numeral 1808 denotes a facsimile (FAX) transmission/reception unit for performing facsimile-transmission of original data read by the image reader 1807, and receiving and decoding an incoming facsimile signal. The FAX transmission/reception unit 1808 has an interface function with external devices. Reference numeral 1809 denotes a telephone set having various telephone functions such as a normal telephone function, an automatic answering telephone function, and the like.

Reference numeral 1810 denotes a memory which includes a ROM for storing a system program, a manager program, other application programs, character fonts, dictionaries, and the like, a RAM for storing an application program, document information, video information, and the like loaded from the external storage device 1812, and the like. Reference numeral 1811 denotes a keyboard for inputting document information, various commands, and the like. Reference numeral 1812 denotes an external storage device using, as storage media, a floppy disk, a hard disk, and the like. The external storage device 1812 stores document information, music or voice information, user's application programs, and the like.

Figure 10:
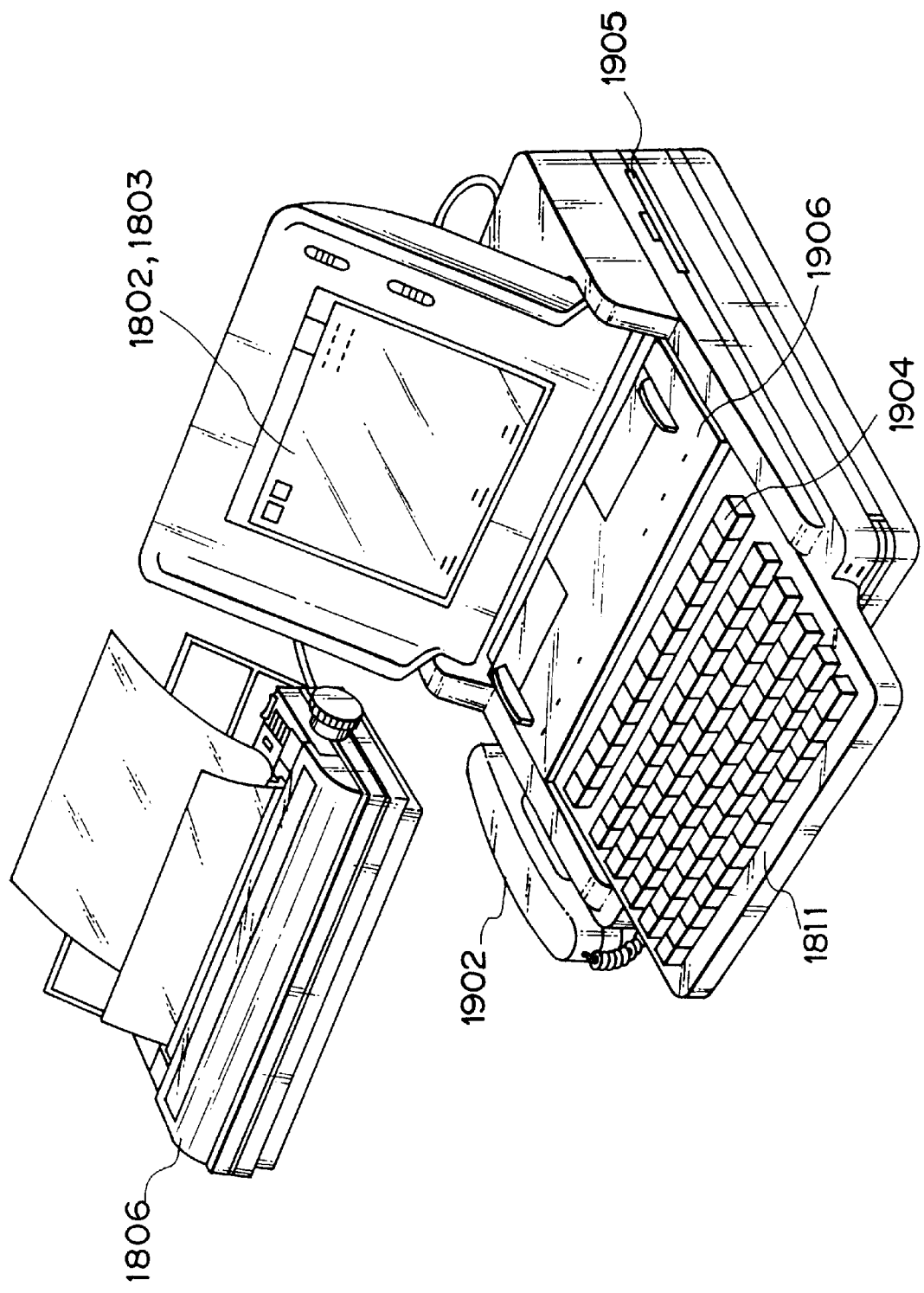
FIG. 10 is a schematic perspective view showing the information processing apparatus in which the liquid crystal display device of the embodiment is incorporated.

FIG. 10 is a schematic perspective view of the information processing apparatus shown in FIG. 9.

Referring to FIG. 10, reference numeral 1802 denotes a flat panel display which utilizes the above-mentioned liquid crystal display, and displays various menus, figure information, document information, and the like. On the display 1802, the coordinate input operation and the item designation input operation can be performed by pressing the surface of the touch panel 1803 with a finger or the like. Reference numeral 1902 denotes a handset used when the apparatus serves as a telephone set. The keyboard 1811 has various function keys 1904 and the like. Reference numeral 1905 denotes an insertion slot of a floppy disk as one medium of the external storage device 1812.

Reference numeral 1906 denotes a paper placing plate where an original to be read by the image reader 1807 is placed. The read original is exhausted from the rear portion of the apparatus. In a facsimile reception mode or the like, received data is printed by the ink-jet printer 1806.

When the information processing apparatus serves as a personal computer or wordprocessor, various kinds of information input from the keyboard 1811 are processed by the control unit 1801 in accordance with a predetermined program, and are output as images via the printer 1806.

When the apparatus serves as a receiver of the facsimile apparatus, facsimile information input from the FAX transmission/reception unit 1808 via a communication line is subjected to reception processing in accordance with a predetermined program, and is output as a received image via the printer 1806.

When the apparatus serves as a copying machine, an original image is read by the image reader 1807, and the read original data is supplied from the control unit 1801 to the printer 1806 and is output as a copy image. When the apparatus serves as a transmitter of the facsimile apparatus, original data read by the image reader 1807 is subjected to transmission processing by the control unit 1801 in accordance with a predetermined program, and is transmitted onto the communication line via the FAX transmission/reception unit 1808.

The above-mentioned information processing apparatus may have an integrated structure that incorporates the ink-jet printer 1806 therein, as shown in FIG. 11. In this case, the portability can be improved. The same reference numerals in FIG. 11 denote the same parts as in FIG. 10, and a detailed description thereof will be omitted.

Note that the present invention may be applied to modifications or changes of the above-mentioned embodiment without departing from the scope of the invention.

The present invention has exemplified a printer apparatus, which comprises means (e.g., an electro-thermal conversion element, laser beam, and the like) for generating heat energy as energy utilized upon execution of ink ejection, and causes a change in state of ink by the heat energy, among the ink-jet recording systems. According to this system, a high-density, high-definition recording operation can be attained.

As the representative arrangement and principle of the ink-jet recording system, one practiced by use of the basic principle disclosed in, for example, U.S. Pat. Nos. 4,723,129 and 4,740,796 is preferred. The above system is applicable to either one of so-called an on-demand type and a continuous type. Particularly, in the case of the on-demand type, the system is effective because, by applying at least one driving signal, which corresponds to recording information and gives a rapid temperature rise exceeding nucleate boiling, to each of electro-thermal conversion elements arranged in correspondence with a sheet or liquid channels holding a liquid (ink), heat energy is generated by the electro-thermal conversion element to effect film boiling on the heat acting surface of the recording head, and consequently, a bubble can be formed in the liquid (ink) in one-to-one correspondence with the driving signal. By ejecting the liquid (ink) through an ejection port by growth and shrinkage of the bubble, at least one droplet is formed. If the driving signal is applied as a pulse signal, the growth and shrinkage of the bubble can be attained instantly and adequately to achieve ejection of the liquid (ink) with particularly high response characteristics.

As the pulse driving signal, signals disclosed in U.S. Pa. Nos. 4,463,359 and 4,345,262 are suitable. Note that further excellent recording can be performed by using the conditions described in U.S. Pat. No. 4,313,124 of the invention which relates to the temperature rise rate of the heat acting surface.

As the arrangement of the recording head, in addition to the arrangement as a combination of ejection ports, liquid channels, and electro-thermal conversion elements (linear liquid channels or right-angled liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses an arrangement using a slit common to a plurality of electro-thermal conversion elements as an ejection portion of the electro-thermal conversion elements, or Japanese Patent Laid-Open No. 59-138461 which discloses an arrangement having an opening for absorbing a pressure wave of heat energy in correspondence with an ejection portion.

Furthermore, as a full line type recording head having a length corresponding to the width of a maximum recording medium which can be printed by the recording apparatus, either the arrangement which satisfies the full-line length by combining a plurality of recording heads as disclosed in the above specification or the arrangement as a single recording head obtained by forming recording heads integrally can be used.

In addition, the present invention is effective for a case using an exchangeable chip type recording head which can be electrically connected to the apparatus main body or can receive ink from the apparatus main body upon being mounted on the apparatus main body, or a cartridge type recording head in which an ink tank is integrally arranged on the recording head itself.

It is preferable to add recovery means for the recording head, preliminary auxiliary means, and the like provided as an arrangement of the print apparatus of the present invention since the effect of the present invention can be further stabilized. Examples of such means include, for the recording head, capping means, cleaning means, pressurization or suction means, and preliminary heating means using electro-thermal conversion elements, another heating element, or a combination thereof. It is also effective for stable recording to execute a preliminary ejection mode which performs ejection independently of recording.

Moreover, in the above-mentioned embodiment, ink is described as a liquid. Alternatively, the present invention may use even ink which is solid at room temperature or less and softens or liquefies at room temperature as long as the ink liquefies upon application of a use recording signal.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, the present invention can be applied to a case wherein ink which liquefies upon application of heat energy, such as ink which liquefies upon application of heat energy according to a recording signal and is ejected in a liquid state, ink which begins to solidify when it reaches a recording medium, or the like, is used. In this case, ink may oppose electro-thermal conversion elements while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned ink.

The present invention may be applied to either a system constituted by a plurality of equipments or an apparatus consisting of a single equipment. The present invention may also be applied to a case wherein the invention is achieved by supplying a program that practices the present invention to the system or apparatus. In this case, a storage medium that stores a program according to the present invention constitutes the present invention. By reading out the program from the storage medium to the system or apparatus, the system or apparatus operates according to the readout program.

As described above, according to the above embodiment, a color or density unevenness caused by variations of ink ejection characteristics of the nozzles of the ink-jet heads can be prevented.

Furthermore, according to the above embodiment, color elements can be accurately formed at a desired density.

As many apparently widely different embodiments of the present invention can be made without departing form the spirit and scope thereof, it is to understood that the invention is not limited to the specific embodiments thereof except as defined in the appended claims.

What is claimed is:

1. A color filter manufacturing apparatus for manufacturing a color filter by ejecting ink from an ink-jet head onto a plurality of color element regions, each of which being segmented by partition members on a substrate, comprising:

an ink-jet head having a plurality of nozzles which are arranged in a first direction and adapted to eject ink, the plurality of nozzles including a plurality of groups of nozzles corresponding to a plurality of colors of the color filter, respectively;

moving means for moving the substrate or said ink-jet head in a second direction substantially perpendicular to the first direction;

ink amount setting means for setting an amount of ink to be applied to each of the color element regions, wherein the amount of ink is set once per one color filter;

applying means for applying ink to different positions, in substantially the first direction, of each of the color element regions on the substrate, by ejecting the same color ink from different nozzles of a group of nozzles of said ink-jet head, corresponding to the color of the color element region, during one movement by said moving means; and control means for controlling to apply ink of a color of the color element region in accordance with the amount of ink set by said ink amount setting means, to each color element region by repeating an operation of ink applications performed by said applying means so that each color element region is filled with ink applied in plural movements by said moving means, each color element region having a different color from neighboring color element regions arranged in the second direction, wherein ink is applied to neighboring color element regions in the second direction by said applying means such that the neighboring color element regions arranged in the second direction have different colors from each other.

2. The apparatus according to claim 1, further comprising means for inclining said ink-jet head by a predetermined amount with respect to the first direction, and wherein said moving means moves said ink-jet head, which is inclined by the predetermined amount, relative to the substrate.

3. The apparatus according to claim 1, wherein the substrate comprises a glass substrate.

4. The apparatus according to claim 1, wherein the partition members comprise light-shielding portions formed between neighboring color element regions on the substrate.

5. The apparatus according to claim 4, wherein said ink-jet head forms the filtering portions by ejecting predetermined color ink within the color element regions, surrounded by the light-shielding portions, on the substrate.

6. The apparatus according to claim 1, wherein an ink reception layer for holding ink is formed on the substrate.

7. The apparatus according to claim 1, wherein the ink-jet head ejects red, green, and blue ink.

8. The apparatus according to claim 1, wherein the ink-jet head is a head for ejecting ink by utilizing heat energy, and comprises a heat energy generating member for generating heat energy to be applied to the ink.

9. An apparatus according to claim 1, wherein said moving means moves the substrate or the ink-jet head a plurality of number of times for each color element region, and said applying means applies ink by ejecting ink from different nozzles in each time of moving.

10. An apparatus according to claim 1, wherein ink ejections are performed in plural relative movements of the substrate and the ink-jet head.

11. A color filter manufacturing apparatus for manufacturing a color filter by ejecting ink from an ink-jet head onto color element regions, each of which being segmented by partition members on a substrate, comprising:

an ink-jet head having a plurality of groups of nozzles corresponding to a plurality of colors of the color filter, respectively;

moving means for effecting relative movement of the substrate and said ink-jet head;

ink amount setting means for setting an amount of ink to be applied to each of the color element regions, wherein the amount of ink is set once per one color filter; and control means for causing said ink-jet head to eject ink plural times in each color element region in accordance with the amount of ink set by said ink amount setting means, during one relative movement by said moving means, from a plurality of different nozzles of a group of nozzles corresponding to a color of each of the color element regions, wherein said control means repeats an operation of ink ejections performed during one relative movement so that each color element region is filled with ink ejected in plural relative movements by said moving means.

12. An apparatus according to claim 11, wherein said moving means effects relative movement of the substrate and the ink-jet head a plurality of number of times for each color element region, and said control means controls ejecting ink from different nozzles in each time of movement.

13. An apparatus according to claim 11, wherein ink ejections are performed in plural relative movements of the substrate and said ink-jet head.

14. A color filter manufacturing method for manufacturing a color filter by ejecting ink from an ink-jet head onto a plurality of color element regions, each of which being segmented by partition members on a substrate, comprising:

a moving step of moving the ink-jet head, having a plurality of nozzles arranged in a first direction, or the substrate relative to the other in a second direction substantially perpendicular to the first direction, the plurality of nozzles including groups of nozzles corresponding to a plurality of colors of the color filter, respectively;

an applying step of applying ink to different positions, in substantially the first direction, of each of the color element regions on the substrate, by ejecting the same color ink from different nozzles of a group of nozzles of the ink-jet head, corresponding to the color of the color element region, during one movement in said moving step; and a control step of controlling to apply ink of a color of the color element region to each color element region by repeating said applying step plural times so that each color element region is filled with ink applied in plural movements in said moving step, each color element region having a different color from neighboring color element regions arranged in the second direction, wherein ink is applied to neighboring color element regions in the second direction such that the neighboring color element regions arranged in the second direction have different colors from each other.

15. The method according to claim 14, wherein said moving step includes a step of moving the ink-jet head and the substrate relative to each other, while the ink-jet head is inclined by a predetermined amount with respect to the second direction.

16. The method according to claim 14, wherein the substrate comprises a glass substrate.

17. The method according to claim 14, further comprising:

a step of forming light-shielding portions as the partition members between neighboring color element regions on the substrate.

18. The method according to claim 17, wherein said applying step includes the step of forming the filtering portions by ejecting predetermined color inks within the color element regions surrounded by the light-shielding portions.

19. The method according to claim 14, further comprising:

a step of forming a reception layer for holding ink on the substrate.

20. A method according to claim 14, wherein in said moving step, the substrate or the ink-jet head is moved a plurality of number of times for each color element region, and in said applying step, ink is applied by ejecting ink from different nozzles in each time of movement.

21. A method according to claim 14, wherein ink ejections are performed in plural relative movements of the substrate and the ink-jet head.

22. A color filter manufacturing method for manufacturing a color filter by ejecting ink from an ink-jet head onto color element regions, each of which being segmented by partition members on a substrate, comprising the steps of:

providing an ink-jet head having a plurality of groups of nozzles, the plurality of groups of nozzles corresponding to a plurality of colors of the color filter, respectively;

effecting relative movement of the substrate and the ink-jet head; and causing the ink-jet head to eject ink plural times in each color element region during one relative movement in said moving step, from a plurality of different nozzles of a group of nozzles corresponding to a color of each of the color element regions; and repeating an operation of ink ejections performed during the one relative movement so that each color element region is filled with ink ejected in plural relative movements effected in said moving step.

23. A method according to claim 22, wherein in said causing step, the substrate or the ink-jet head is moved a plurality of times for each color element region, and each of the color element regions is formed by ejecting ink from different nozzles in each time of movement.

24. A method of eliminating coloring unevenness of a color filter, formed by ejecting ink from an ink-jet head, having a plurality of groups of nozzles corresponding to a plurality of colors of the color filter, respectively, onto a plurality of color element regions, each of which being segmented by partition members on a substrate, said method comprising the steps of:

setting an amount of ink to be applied to each of the plurality of color element regions, wherein the amount of ink is set once per one color filter;

supplying a driving signal to the ink-jet head so as to eject the ink from different nozzles of a group of nozzles;

applying ink to each color element region on the substrate by ejecting the same color ink plural times in accordance with the amount of ink set in said setting step, from different nozzles of a group of nozzles corresponding to the color of each color element region, during one relative movement; and repeating an operation of ink ejections performed during the one relative movement so that each of the color element regions is filled with ink by plural ink ejections onto different positions in each color element region, from a plurality of different nozzles of the group of nozzles corresponding to the color of each of the color element regions.

25. A method according to claim 24, wherein in said applying step, the substrate or the ink-jet head is moved a plurality of number of times for each color element region, and each of the color element regions is formed by ejecting ink from different nozzles in each time of movement.

26. A method according to claim 24, wherein the plural ink ejections are performed in plural relative movements of the substrate and the ink-jet head.

27. A method of manufacturing a color filter by ejecting ink from an ink-jet head onto color element regions, each of which being segmented by partition members on a substrate, comprising the steps of:

moving at least one of the ink-jet head and the substrate relative to the other;

applying ink to each of a plurality of color element regions on the substrate by a plurality of ink ejections, the plurality of ink ejections being performed onto different positions in each color element region from different nozzles of the ink-jet head during one relative movement in said moving step; and repeating an operation of the plurality of ink ejections performed during the one relative movement so that each color element region is filled with a plurality of inks, by plural relative movemens.

28. A method according to claim 27, wherein the plurality of ink ejections are performed by using different nozzles of the ink-jet head.

29. A method according to claim 27, wherein the ink-jet head has a plurality of nozzles which are arranged in a first direction and adapted to eject ink, and in said moving step, the substrate or the ink-jet head is moved in a second direction substantially perpendicular to the first direction, and the ink-jet head is moved a predetermined length in the first direction in each relative movement.

30. A color filter manufacturing method for manufacturing a color filter by ejecting ink from an ink-jet head onto color element regions, each of which being segmented by partition members on a substrate, comprising the steps of:

moving the ink-jet head or the substrate relative to the other; and ejecting the same color ink plural times during one relative movement in said moving step onto at least one of the color element regions on the substrate by a plurality of ink ejections, each of the plurality of ink ejections being performed onto a different position in the at least one color element region, wherein the plurality of ink ejections during one relative movement are performed by using different nozzles and an amount of ink ejected from each of the nozzles is substantially the same, and each color element region is filled with plural relative movements by repeating and operation of the plurality of ink ejections performed during the one relative movement.

* * * * *